United States Patent
Nakamoto et al.

(10) Patent No.: US 9,601,800 B2
(45) Date of Patent: Mar. 21, 2017

(54) CHARGING METHOD

(75) Inventors: Takeshi Nakamoto, Kyoto (JP); Koichi Nishiyama, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 450 days.

(21) Appl. No.: 13/565,660

(22) Filed: Aug. 2, 2012

(65) Prior Publication Data

US 2012/0293126 A1    Nov. 22, 2012

Related U.S. Application Data

(63) Continuation-in-part of application No. PCT/JP2011/052229, filed on Feb. 3, 2011.

(30) Foreign Application Priority Data

Feb. 4, 2010 (JP) .................. 2010-023572

(51) Int. Cl.
  *H02J 7/00* (2006.01)
  *H01M 10/0525* (2010.01)
  (Continued)

(52) U.S. Cl.
  CPC ....... *H01M 10/0525* (2013.01); *H01M 4/485* (2013.01); *H01M 4/505* (2013.01);
  (Continued)

(58) Field of Classification Search
  CPC .................................................. H02J 7/0014
  (Continued)

(56) References Cited

U.S. PATENT DOCUMENTS 5,576,608 A * 11/1996 Nagai et al. .................. 320/159
6,479,969 B1 * 11/2002 Fazakas ................ H02J 7/0093
                                                        320/139

(Continued)

FOREIGN PATENT DOCUMENTS

EP    1 841 003 A1    10/2007
JP    05-11184 A       4/1993
(Continued)

OTHER PUBLICATIONS

International Search Report in PCT/JP2011/052229 dated Feb. 3, 2011 (English Translation Thereof).

(Continued)

*Primary Examiner* — Drew A Dunn
*Assistant Examiner* — Zixuan Zhou
(74) *Attorney, Agent, or Firm* — McGinn IP Law Group, PLLC

(57) ABSTRACT

A charging method to charge a lithium ion battery in a short amount of time at low cost without degradation of the lithium ion battery is provided. A lithium ion battery includes a lithium compound containing iron as a positive electrode active material. The lithium ion battery is charged through a quasi-constant voltage charging procedure. The lithium ion battery includes a lithium compound as a positive electrode active material used for a positive electrode material. With the lithium compound, a voltage in a flat voltage section of a charging characteristic curve is higher than a voltage of a battery including the lithium compound containing iron as the positive electrode active material. The lithium ion battery may be an assembled battery including a plurality of electric cells connected in series.

15 Claims, 9 Drawing Sheets

(51) Int. Cl.
*H01M 4/485* (2010.01)
*H01M 4/505* (2010.01)
*H01M 4/525* (2010.01)
*H01M 4/58* (2010.01)
*H01M 10/44* (2006.01)

(52) U.S. Cl.
CPC ......... *H01M 4/525* (2013.01); *H01M 4/5825* (2013.01); *H01M 10/441* (2013.01); *Y02E 60/122* (2013.01)

(58) Field of Classification Search
USPC .................................................. 320/116–119
See application file for complete search history.

(56) References Cited

U.S. PATENT DOCUMENTS

| | | | |
|---|---|---|---|
| 7,025,907 B2 | 4/2006 | Kohzaki et al. | |
| 7,109,684 B2* | 9/2006 | Takaoka | H02J 7/0029 320/132 |
| 7,189,475 B2* | 3/2007 | Sasaki | H01M 10/0525 429/206 |
| 7,227,335 B2* | 6/2007 | Sakakibara | G01R 31/3679 320/132 |
| 8,691,445 B2* | 4/2014 | Park | H01M 4/131 429/209 |
| 2002/0182497 A1 | 12/2002 | Kohzaki et al. | |
| 2004/0135544 A1* | 7/2004 | King et al. | 320/116 |
| 2004/0241534 A1* | 12/2004 | Suzuki | H02J 7/0086 429/50 |
| 2006/0226810 A1* | 10/2006 | Yang | H02J 7/0003 320/116 |
| 2007/0278995 A1* | 12/2007 | Batdorff | H01M 2/1022 320/107 |
| 2008/0203969 A1 | 8/2008 | Kurihara et al. | |
| 2010/0253284 A1* | 10/2010 | Aoki | H01M 10/441 320/118 |
| 2010/0283427 A1* | 11/2010 | Sugiyama | H01M 16/00 320/118 |
| 2011/0012604 A1* | 1/2011 | Tsujiko | H01M 10/48 324/427 |
| 2011/0267006 A1 | 11/2011 | Tanno | |

FOREIGN PATENT DOCUMENTS

| | | | |
|---|---|---|---|
| JP | 2002-199604 A | | 7/2002 |
| JP | 2003-034534 A | | 2/2003 |
| JP | 2006-196470 A | | 7/2006 |
| JP | 2006196470 A | * | 7/2006 |
| JP | 2009-106052 A | | 5/2009 |
| JP | 2009-296699 A | | 12/2009 |
| JP | 2011-018547 A | | 1/2011 |

OTHER PUBLICATIONS

Extended European Search Report dated Oct. 25, 2016.
United States Office Action dated Nov. 15, 2016, in U.S. Appl. No. 14/658,059.

* cited by examiner

CHARGING METHOD

CROSS REFERENCE TO RELATED APPLICATION

The present application claims priority from and is a Continuation-in-Part of International application No. JP2011/052229 filed on Feb. 3, 2011, and from Japanese Patent Application No. 2010-023572 filed on Feb. 4, 2010. The entire content of this priority application is incorporated herein by reference.

FIELD OF THE INVENTION

The present invention relates to a charging method to charge a lithium ion battery, especially, a charging method to charge a lithium ion battery including a lithium compound as a positive electrode active material containing iron used for a positive electrode material.

BACKGROUND

Currently, a lithium compound (more precisely, a lithium metal oxide) such as a lithium manganese oxide and a lithium cobalt oxide is widely used for a positive electrode active material in a lithium ion battery.

In recent years, more and more researches have been carried out in lithium compounds containing iron, which are used for positive electrode active materials. The lithium compounds containing iron are thermally stable. In comparison to a battery including a widely used cobalt-based lithium compound as a positive electrode material, the stability in battery performance can be further improved with the lithium compounds containing iron. This is a main reason why the lithium compounds containing iron have been focused.

A so-called constant current constant voltage charging procedure is used as a general method for charging a lithium ion battery. In the constant current constant voltage method, a battery is charged with a constant current during an early stage of the charge and the charge is continued while a battery voltage is maintained at a set voltage after the battery voltage has reached the set voltage.

However, a problem occurs when the widely used constant current constant voltage charging procedure is used for a lithium ion battery including a lithium compound containing iron as a positive electrode material.

The present invention was made in view of the foregoing circumstances. An objective of the present invention is to reduce degradation of a lithium ion battery and to provide a method for charging the battery in a short amount of time at low cost.

SUMMARY OF THE INVENTION

A charging method to charge a lithium ion battery includes: charging the lithium ion battery including a lithium compound as a positive electrode active material used for a positive electrode material through a quasi-constant voltage charging procedure; and reducing a charging current as the charge proceeds toward a late stage during the charging of the lithium ion battery. The lithium compound contains iron.

DETAILED DESCRIPTION OF THE PREFERRED EMBODIMENTS

According to a study of the inventor of this application, a problem occurs when the widely used constant current constant voltage charging procedure is used for a lithium ion battery including a lithium compound containing iron as a positive electrode material.

A reason why such a problem occurs will be explained in detail by comparing a standard lithium ion battery including a lithium manganese oxide ($LiMn_2O_4$) as a positive electrode active material with a lithium ion battery including a lithium ion phosphate ($LiFePO_4$), which is a lithium compound containing iron, as a positive electrode active material.

A regular graphite material is used for a negative electrode of the lithium iron battery. For a simple explanation, the lithium ion battery including the lithium manganese oxide ($LiMn_2O_4$) as the positive electrode active material and the lithium ion battery including the lithium ion phosphate ($LiFePO_4$) as the positive electrode active material may be referred to as "manganese battery" and "iron battery," respectively, in the following description.

Figure 4:
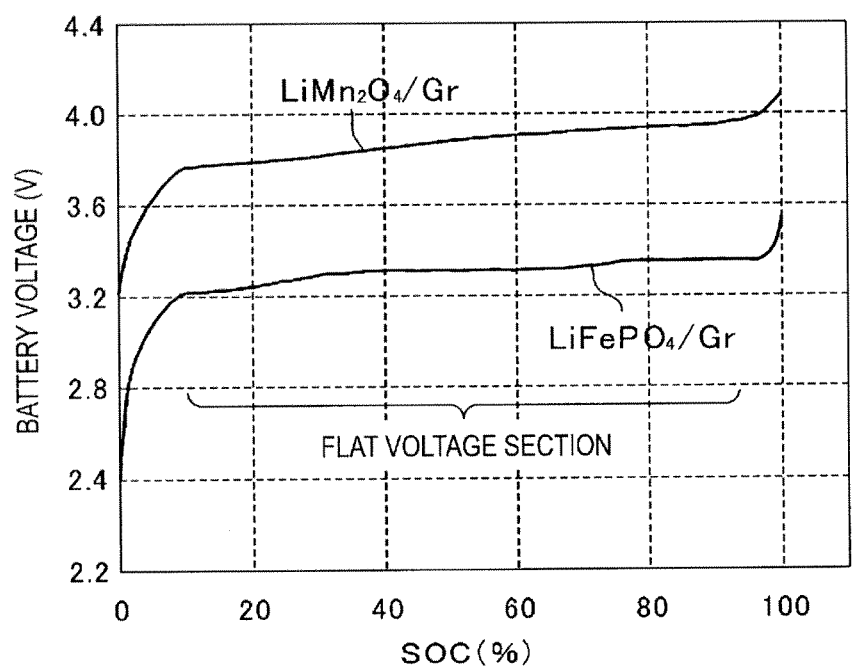
FIG. 4 is a characteristic diagram illustrating differences between charging characteristics due to differences in types of positive electrode active materials.

FIG. 4 illustrates charging characteristics of the manganese battery and the iron battery. In FIG. 4, the abscissa represents a state of charge (SOC: hereinafter may be referred to as "SOC." SOC is an abbreviation of state of charge.), and the ordinate represents a battery voltage (an open voltage) of an electric cell. The state of charge (SOC) is a percentage of remaining secondary battery capacity at a time point over a remaining battery capacity of the secondary battery on a full charge (i.e., a battery capacity). The charging characteristics of the manganese battery and the iron battery are expressed by "$LiMn_2O_4$/Gr" and "$LiFePO_4$/Gr," respectively.

As illustrated in FIG. 4, flat voltage sections (also referred to as plateaus) widely extend after the voltages rise in the early stage of the charge of the iron battery and the manganese battery. In the flat voltage sections, the voltages gradually increase. The voltages sharply increase in the late stage of the charge. Patterns of such charging characteristics are basically the same. However, distinctive differences are recognized. For instance, the voltages of the iron battery are significantly lower in the flat voltage section in which the voltage gradually increases than those of the manganese battery. Moreover, an increase (a gradient of the curve) in voltage of the iron battery in the flat voltage section is smaller than that of the manganese battery.

The increases in voltage of both batteries in the late stage of charge are significant. However, the increase in voltage of the iron battery is more significant than that of the manganese battery. The curve of the iron battery sharply rises. This is different from the curve of the manganese battery.

Figure 5:
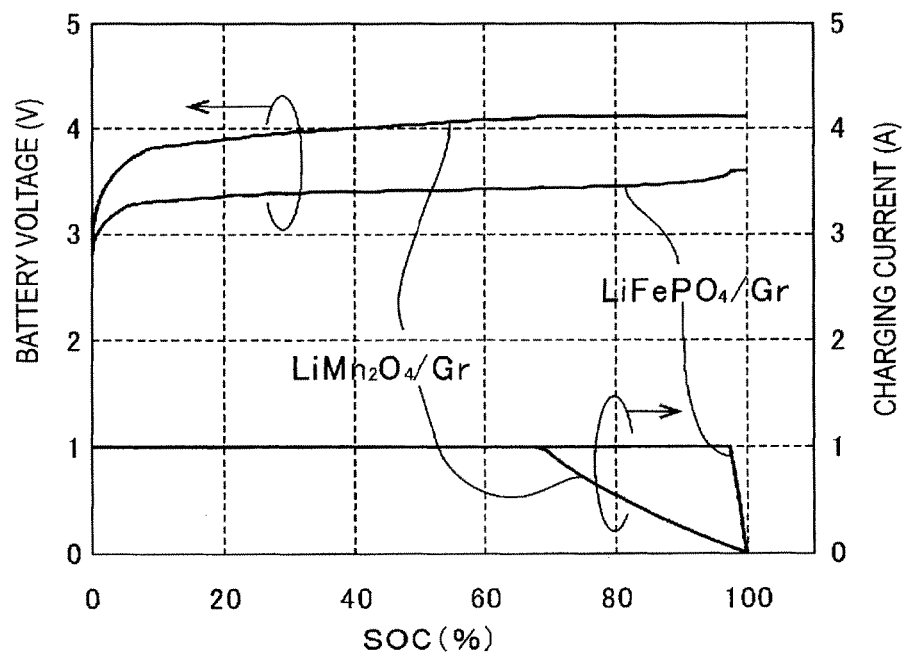
FIG. 5 is a characteristic diagram illustrating variations in voltage and current during a constant current constant voltage charging procedure.

FIG. 5 illustrates charging characteristics obtained by charging the batteries having the above-described charging characteristics through the constant current constant voltage charging procedure. In FIG. 5, the ordinates represent a battery voltage and a charging current, and the abscissa represents a state of charge. Variations in voltage and current of the batteries in respective charged conditions when the batteries are charged with 1 CA are present.

In FIG. 5, the characteristic curve of the manganese battery is denoted by "$LiMn_2O_4$/Gr" and the characteristic curve of the iron battery is denoted by "$LiFePO_4$/Gr." The voltage of the constant voltage charge for the manganese battery is about 4.1V and for the iron battery is about 3.6V.

When the characteristic curves in FIG. 5 are compared with each other, the following characteristics are observed. When the SOC of the manganese battery is about 70%, the charging is shifted from the constant current charging to the constant voltage charging. The charging current gradually decreases. The constant current charging of the iron battery continues until the late stage of the charge.

This is because the charging characteristics of the iron battery show that the increase in voltage is significantly small while the charging progresses.

Even though the increase in voltage is small, the voltage actually increases. If a voltage at which the charging is shifted from the constant current charging to the constant voltage charging is accurately set, the charging of the iron battery may be able to be shifted to the constant voltage charging in a similar manner to the charging of the manganese battery.

However, setting the voltage at which the charging is shifted to the constant voltage charging with high accuracy is not practically easy. Even if a tolerance of voltage in the constant voltage charging is slightly large, the charging enters into the late stage before the voltage reaches the constant voltage.

The iron battery has a problem that a large current flows in the late stage of charge. The reason why such a problem occurs will be explained with reference to a graph related to a positive electrode potential in FIG. 6 and a graph related to a negative electrode potential in FIG. 7.

Figure 6:
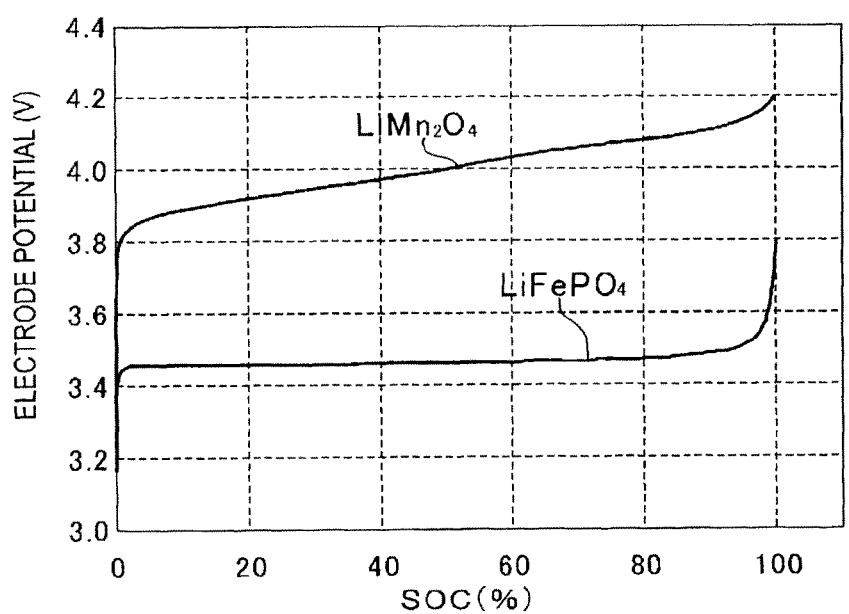
FIG. 6 is a characteristic diagram illustrating variations in positive electrode potential versus states of charge.

In FIG. 6, the abscissa represents a state of charge (SOC), and the ordinate represents a positive electrode potential that is expressed based on a standard electrode potential, that is, Li/Li+. In FIG. 6, an electrode potential characteristic curve when $LiMn_2O_4$ is used as a positive electrode active material is denoted by "$LiMn_2O_4$." Furthermore, an electrode potential characteristic curve when $LiFePO_4$ is used as a positive electrode active material is denoted by "$LiFePO_4$."

Figure 7:
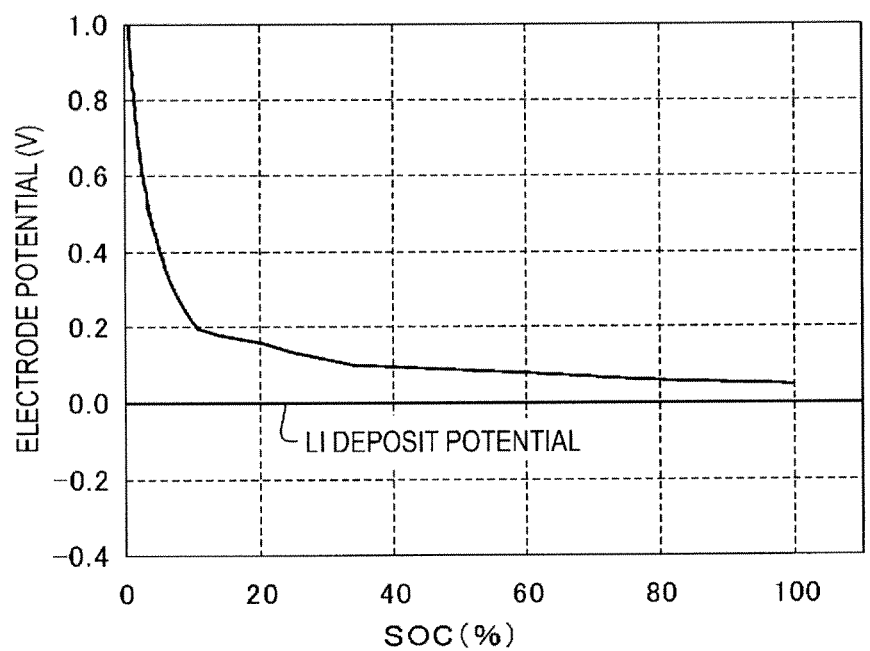
FIG. 7 is a characteristic diagram illustrating variation in negative electrode potential versus states of charge.

In FIG. 7, the abscissa represents a state of charge (SOC), and the ordinate represents a negative electrode potential that is expressed based on a standard electrode potential, that is, Li/Li+. The negative electrodes of the iron battery and the manganese battery in this example are common graphite electrodes. Therefore, both batteries show the same characteristic curve illustrated in FIG. 7.

As described above, the iron battery and the manganese battery have the common negative electrode configuration.

The differences in charging characteristics between the batteries illustrated in FIG. 4 are represented as normalized charging characteristics in FIG. 6. As illustrated in FIG. 6, the flat voltage section of the charging characteristic curve of the battery including $LiFePO_4$ as a positive electrode active material is very close to flat.

As illustrated in FIG. 7, the negative electrode potential sharply decreases in the early stage of the charge and then gradually decreases as the charge progresses. The negative electrode potential decreases toward a level denoted as "Li deposit potential" at 0.0V.

As denoted as "Li deposit potential," lithium (Li) is deposited on the negative electrode when the negative electrode potential decreases below 0.0V. It is well known that the battery degrades when the lithium (Li) is deposited on the negative electrode.

With the characteristics illustrated in FIG. 7, if a large current continues to flow until the charge progresses into the late stage, the charge may progresses too far. As a result, the negative electrode potential tends to decrease toward the "Li deposit potential." An imbalance between an application amount of the positive electrode active material and an application amount of the negative electrode material (graphite) or other manufacturing-related variations may occur. Furthermore, the negative electrode potential may decrease below the "Li deposit potential" due to a charging circuit having an insufficient operating accuracy.

To avoid such a problem, the application amount of the negative material (graphite) may be increased to set the negative electrode potential on a full charge to a higher level. Furthermore, a charging circuit with high accuracy sufficient for very gradual voltage increase in the flat voltage section regarding the iron battery may be used. Moreover, the charging current may be decreased.

However, if the application amount of the negative electrode material is increased, the imbalance between the application amounts of the positive electrode active material and the negative electrode material may grow further. As a result, a battery energy density decreases.

To improve accuracy in switching in the charging circuit to correspond to the charging characteristics of the iron battery in FIG. 4, a setting error in switching voltage needs to be equal to or smaller than ±10 mV. However, such accuracy cannot be achieved in a practical charging circuit configured to charge a battery with a large current.

Furthermore, simply reducing the charging current may lose advantages of the lithium ion battery, which includes high charge acceptance performance suitable for rapid charge.

A first distinctive feature of a charging method for charging a lithium ion battery according to the present invention is as follows. The charging method includes charging a lithium ion battery including a lithium compound containing iron as a positive electrode active material used for a positive electrode material through a quasi-constant voltage charging procedure. The lithium compound contains iron.

According to a thorough study of the inventor of this application, a lithium ion battery including a lithium compound containing iron as a positive electrode material can be properly charged without degradation using the quasi-constant voltage charging procedure. The quasi-constant voltage charging procedure has been considered inadequate in such an application.

The quasi-constant voltage charging procedure is known as a charging procedure in which a voltage having dropping characteristics is applied according to a state of charge of a battery. The quasi-constant voltage charging procedure is a commonly used procedure for charging a lead battery. The quasi-constant voltage charging procedure only requires a simple circuit configuration and thus a cost for charging the battery can be reduced. However, the quasi-constant voltage charging procedure has a disadvantage that the application voltage varies according to variations in power supply voltage. Because of the disadvantage, the quasi-constant voltage charging procedure is not adequate for charging the lithium ion battery and not considered as a procedure for charging the lithium ion battery.

The lithium ion battery generally tends to rapidly degrade when a voltage of the lithium ion battery is increased to a high level, for instance, above 4.2V. Therefore, battery voltages of commonly used cobalt or manganese lithium ion batteries are usually set to about 4.1V. If the quasi-constant voltage charging procedure having a problem that the application voltage to the battery varies according to variations in power supply voltage is used, the battery is more likely to degrade due to the variations in application voltage. This is because a sufficient margin is not provided between the set battery voltage and a voltage at which the above-described degradation starts.

Furthermore, the battery voltage set for the charge is close to the voltage in the flat voltage section of the charging characteristic curve. Therefore, an insufficient charge is more likely to occur due to the variations in application voltage.

For the above reasons, the quasi-constant voltage charging procedure has not been considered as a procedure for charging a lithium ion battery.

As illustrated in FIG. 4, the lithium ion battery including the lithium compound containing iron as a positive electrode active material has characteristics that the battery voltage in the flat voltage section is low and the increase in voltage in the flat voltage section is small. If the battery voltage is set to 3.6V in the charging characteristic curve denoted as "LiFePO$_4$," a sufficient margin could be obtained between the battery voltage and the upper limit voltage at which the degradation of the battery starts (e.g., 4.2V). Furthermore, the battery voltage is sufficiently higher than the voltage in the flat voltage section. Therefore, an insufficient charge is less likely to occur.

A difference between the voltage in the flat voltage section and the upper limit voltage is not limited to 0.6V. The difference can be 0.6V or higher. The power supply voltage of the alternate current power source has a tolerance of ±10%. Therefore, the upper limit voltage should be 110% of the voltage in the flat voltage section or higher. More preferably, the upper limit should be 110% of the voltage in the flat voltage section in the late stage of the charge. With this configuration, an insufficient charge is less likely to occur due to the alternate current voltage that has reached the upper limit voltage.

The SOC in the late stage of the charge should be 90% or higher. Regarding a definition of the flat voltage section, even if a section of the charging characteristic curve (or the SOC-voltage curve) has a gradient but the gradient is smaller than that in the late stage of the charge, that section is considered to be the flat voltage section. Namely, the flat voltage section is not limited to the section that is perfectly flat. In the case that the charging characteristic curve varies stepwise as in a second embodiment, which will be explained later, because another active material is mixed, a difference between at least the voltage in the lowest flat voltage section and the upper limit voltage should be equal to or higher than 0.6V.

Figure 2:
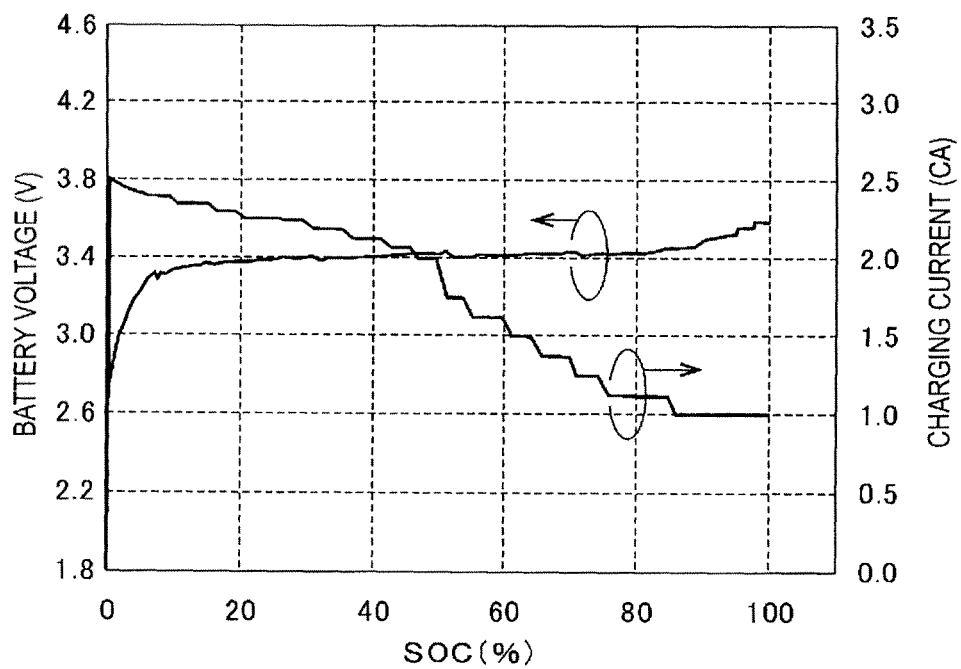
FIG. 2 is a characteristic diagram illustrating progress of charge when a technology according to the present invention is applied.

When a lithium ion battery including a lithium compound containing iron as a positive electrode active material is charged through the quasi-constant voltage charging procedure, a charging current and a charging voltage measure as in FIG. 2. Referring to FIG. 2, the charging current gradually decreases as the charging reaches the late stage due to the dropping characteristics appear in the quasi-constant voltage charging procedure device. Therefore, a problem such as deposition of lithium (Li) that may occur during the charge through the constant current constant voltage charging procedure is less likely to occur. The characteristic curves in FIG. 2 are obtained in a rapid charge of the battery with the maximum current of 2.5 CA.

A second distinctive feature of a charging method for charging a lithium ion battery is as follows. The charging method includes charging a lithium ion battery having the following configuration. The lithium ion battery includes a lithium compound containing iron and a specific lithium compound as a positive electrode active material used for a positive electrode material through a quasi-constant voltage charging procedure. The lithium ion battery includes a plurality of electric cells connected in series. The specific lithium compound is a compound with which a voltage in a flat voltage section of a charging characteristic curve is higher than a voltage of a battery including the lithium compound containing iron as the positive electrode active material.

When an object to be charged is an assembled battery including electric cells (or simply "cells") connected in series, charged levels may vary between the electric cells in the assembled battery. For example, the assembled battery includes four electric cells connected in series and a voltage of 3.6V is applied to each electric cell, that is, a voltage of 14.4V is applied to the lithium ion battery, which is an assembled battery. If one of the electric cells is overcharged, the battery voltage may be increased to the 3.9V but the battery voltage of the rest of the electric cells may be at 3.5V. Such variations may occur.

To reduce such variations in voltage between the electric cells, a balance circuit may be provide for each electric cell to release a current in the electric cell to a resistor. This configuration is commonly used so that the battery voltage of the electric cell having a higher battery voltage than that of other electric cells can be reduced through the balance circuit.

In the charge of the lithium ion battery including the lithium compound containing ion as the positive electrode material, the increase in voltage in the flat voltage section is very gentle, as described earlier. Therefore, the battery voltages are not significantly different even the charge differently progresses between the electric cells.

In the charge of the lithium ion battery including the lithium compound containing ion as the positive electrode material, the balance circuit is activated when the difference in cell voltage becomes large in the late stage of the charge. For example, the charging voltage of each electric cell is set to 3.6V and if the battery voltage of the electric cell reaches 3.7V, the balance circuit is activated to reduce the battery voltage.

If the balance circuit is activated in the section in which the voltage sharply increases around the late stage of the charge, the battery voltage may exceed 4.2V because the balancing operation cannot catch up with a speed of the voltage increase. This may result in degradation of the battery.

The above-described quasi-constant voltage charging procedure is especially suitable for charging the lithium ion battery including the specific lithium compound (hereinafter may be referred to as a mixing lithium compound), with which the voltage in the flat voltage section of the charging characteristic curve is higher than that of the lithium ion battery including the lithium compound containing iron as the positive electrode material, as the positive electrode material.

If the lithium compound containing iron and the specific lithium compound (the mixing lithium compound) are mixed and used as a positive electrode material, characteristics of both materials appear in the charging characteristic curve.

Figure 3:
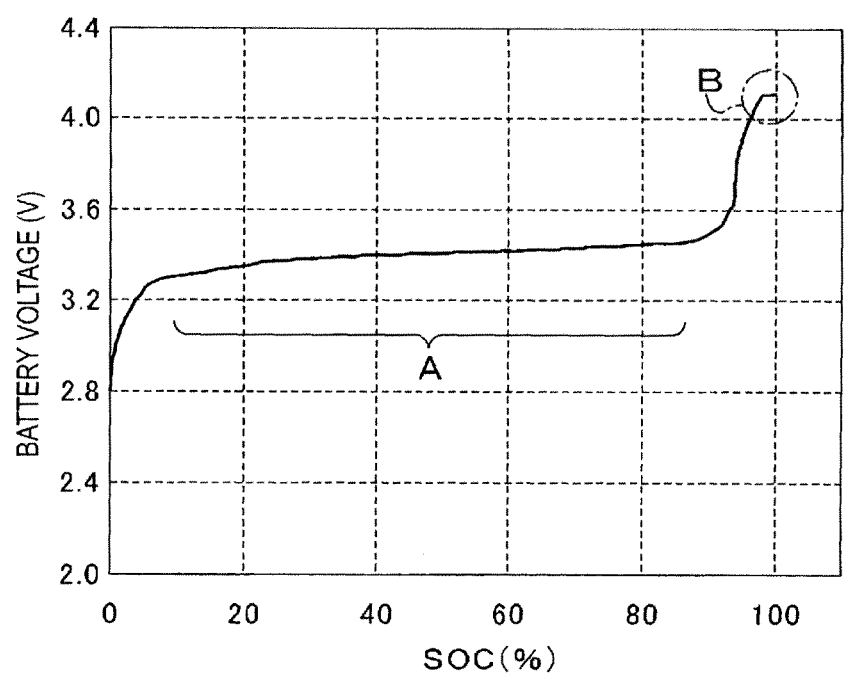
FIG. 3 is a characteristic diagram illustrating progress of charge of an electric cell according to a second embodiment of the present invention.

FIG. 3 illustrates a charging characteristic curve of a battery including a positive electrode material to which a small amount of the specific lithium compound is added. The characteristics of the lithium compound containing iron appear in a wide section denoted by symbol A. The characteristics of the lithium compound containing the specific lithium compound appear in a section encircled and denoted by symbol B. Namely, different levels of voltage flat sections are present.

Some of the electric cells may be overcharged and the cell voltage may continue to increase after exceeding 3.6V. Even in such a case, the increase in cell voltage temporarily slows down in the 4.1V-flat voltage section denoted by B if the electric cells have the characteristics illustrated in FIG. 3. Even if a period in which the increase slows down is a few hours, the cell voltages of other electric cells can be properly increased in this period.

If required characteristics of the specific compound are expressed by a ratio of a positive electrode potential to a reference electrode potential, that is, Li/Li+ as illustrated in FIG. 6, the voltage in the voltage flat section is in a range from 3.5V to 4.2V. If parameters of element such as the ratio of the specific lithium compound to the lithium compound containing iron are properly set, the balance circuit may not be required.

A third distinctive feature of a charging method for charging a lithium ion battery is as follows. The charging method includes charging an assembled battery through a charging circuit having dropping characteristics. The assembled battery includes a plurality of lithium ion batteries connected in series and a balance circuit. Each lithium ion battery includes a specific lithium compound and a lithium compound containing iron as a positive electrode material used for a positive electrode material. The specific lithium compound contains a positive electrode active material such that a voltage in a flat voltage section is higher than that of a battery including the lithium compound containing iron as a positive electrode active material. The charging circuit includes a switch, a transformer, and a diode bridge. The dropping characteristics are for reducing an application voltage as a charging current increases.

The assembled battery includes the lithium ion batteries connected in series and the balance circuit. Each battery includes the specific lithium compound and the lithium compound containing iron as a positive electrode material for the positive electrode material. For charging such an assembled battery, the charging circuit having the dropping characteristics for reducing the application voltage as the charging current increases may be used. The charging circuit includes the switch, the transformer, and the diode bridge. With this configuration, the assembled battery can be charged through the quasi-constant voltage charging procedure. Even if the lithium ion batteries are charged at different paces, they can be substantially equally charged at the end. The balance circuit is a known circuit for cell balance between the lithium ion batteries in the assembled battery during the charge. Charging paths are switched based on terminal voltages of the lithium ion batteries.

A fourth distinctive feature of a charging method for charging a lithium ion battery is as follows. The charging method uses the quasi-constant battery charging for charging an assembled battery including four lithium ion batteries connected in series. Each lithium ion battery includes a specific lithium compound and a lithium compound containing iron as a positive electrode material. The specific lithium compound contains a positive electrode active material such that a voltage in a flat voltage section is higher than that of a battery including the lithium compound containing iron as a positive electrode active material.

For example, each lithium ion battery in the assembled battery may be charged with a voltage of about DC3.5V. If specific one of the lithium ion batteries reaches 3.5V and other lithium ion batteries are below 3.5V with a large tolerance of the power supply in the charging circuit on the positive side, a voltage equal to or higher than an allowable voltage may be applied to the specific lithium ion battery. The tolerance of output voltage of an inexpensive power supply circuit may be several percent. Even in such a case, the voltage does not reach a level at which the specific lithium ion battery may be damaged without a complex balance circuit for accurately limiting the charging voltages by monitoring the voltages of the lithium ion batteries because the assembled battery only includes four lithium ion batteries.

A fifth distinctive feature of a charging method for charging a lithium ion battery is as follows. The charging method uses a DC12V battery charger for charging the assembled battery. Because the method uses the quasi-constant voltage charging procedure, a standard DC12V battery charger that is widely used for charging a vehicular lead battery can be used.

The graphite may be suitable for the negative electrode material of the lithium ion batteries. $LiFePO_4$ may be suitable for the lithium compound containing iron.

$LiCoO_2$, nickel-based $LiNiO_2$, manganese $LiMn_2O_4$, or Li—Co—Ni—Mn based oxide may be suitable for the specific lithium compound. The ratio of the specific lithium compound to the lithium compound containing iron may be equal to or less than five percent by mass.

ADVANTAGEOUS EFFECT OF THE INVENTION

As described above, the lithium ion batteries including the lithium ion compounds containing iron as the positive electrode active materials are charged through the quasi-constant voltage charging procedure. With this method, the lithium ion batteries can be charged in a short amount of time at low cost without degradation of the lithium ion batteries.

MODE FOR CARRYING OUT THE INVENTION

An embodiment of a charging method to charge a lithium ion battery according to the present invention will be explained with reference to drawings.

First Embodiment

Figure 1:
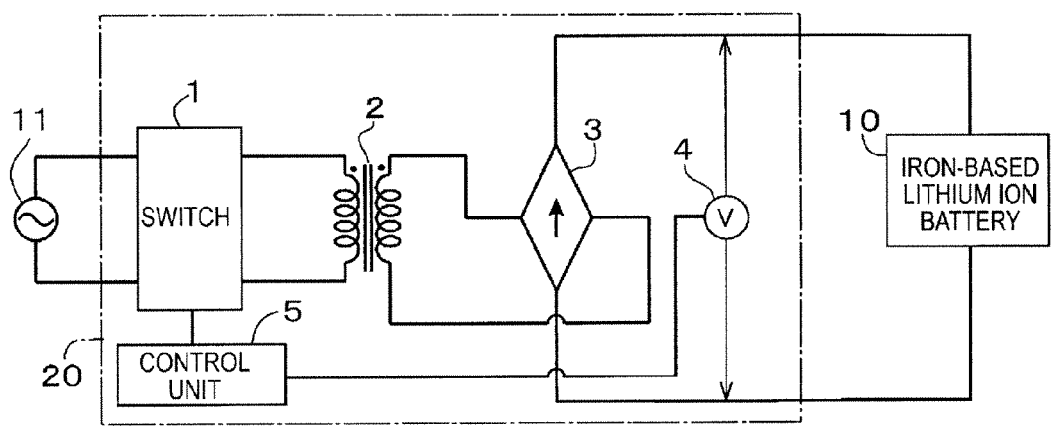
FIG. 1 is a diagram illustrating a schematic configuration of a charging circuit according to an embodiment of the present invention.

A charging circuit 20 is illustrated in FIG. 1 as an example according to the present invention.

The charging circuit 20 includes a switch 1, a transformer 2, and a rectifier 3. The switch 1 is for starting and halting power supply from an alternate current power source 11 that is usually a known commercial power source. The transformer 2 is for converting a voltage of the alternate current power source 11 to a desired voltage. The rectifier 3 includes a diode bridge.

The charging circuit 20 further includes a control unit 5. The control unit 5 is configured to monitor an application voltage from the rectifier 3 to a lithium ion battery 10 to be charged using a voltage sensor 4 and to control open and close of the switch 1 to adjust the application voltage to a desired voltage. A leakage transformer is used for the transformer 2. The leakage transformer is configured such that the secondary voltage does not significantly decrease and thus a large secondary current does not flow when a current flows through the secondary windings.

With the leakage transformer, the charging current 20 can achieve dropping characteristics, that is, the application voltage can be decreased according to an increase in charging current for the quasi-constant voltage charging procedure.

The lithium ion battery to be charged in this embodiment is a lithium ion battery including a lithium compound (more precisely a lithium metal oxide) containing iron as a positive electrode active material. More specifically, the lithium ion battery includes $LiFePO_4$ as a positive electrode active material.

In FIG. 1, the lithium ion battery 10 is indicated as "Iron-based lithium ion battery." Apart of $LiFePO_4$ may be replaced by another kind of metal element such as Co, Al, and Mg and used as a positive electrode active material. Standard graphite may be used for the negative electrode.

A step of manufacturing a positive electrode plate of the lithium ion battery 10 including the above positive electrode active material will be briefly explained.

First, the above positive electrode active material, a binding agent, and a solvent are mixed to produce a paste (slurry). If necessary, an electrically conductive additive may be added to the mixture. The paste is then applied to a current collector made of aluminum. The current collector is dried out and the positive electrode plate is prepared. If an energy density needs to be further increased, the dried positive electrode plate is pressed.

PVdF is typically used as a solvent-type binding agent and SBR is typically used as a water-type binding agent. The solvent-type binding agent or the water-type binding agent can be used. Acetylene black, carbon fibers, or nanotube may be used for the electrically conductive additive.

When the lithium ion battery 10 with the above-described positive electrode plate is charged as an electric cell, the charge progresses as illustrated in FIG. 2. An output voltage of the charging circuit 20 is set to 3.6V.

As described earlier, the lithium ion battery 10 includes the lithium compound, which containing iron, as the positive electrode active material. Therefore, the difference between the battery voltage in the flat voltage section and the upper limit voltage is relatively large. Even if the lithium ion battery is charged using the alternate current power source, the charging voltage is less likely to exceed the upper limit voltage. Regarding the iron-based lithium ion battery, even if the lithium ion battery is simply charged by the alternate current power source, the degradation of the lithium ion battery slowly progresses.

Figure 8:
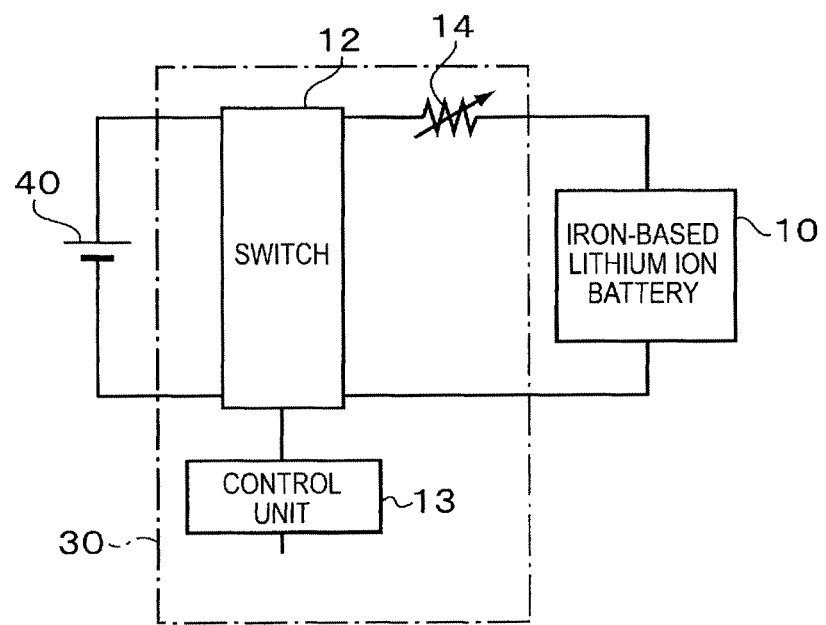
FIG. 8 is a circuit diagram illustrating a schematic configuration of a charging circuit configured to perform direct current charging.

The lithium ion battery 10 may be charged with direct current power supplied by a direct current power source. As illustrated in FIG. 8, a charging circuit 30 charges the lithium ion battery 10 with a direct current power source 40. A charging current is decreased as the charge proceeds to the late stage. Specifically, the charging circuit 30 includes a switch 12, a control unit 13, and a resistor 14 (preferably a variable resistor). The resistor 14 is connected between the direct current power source 40 in a charging path. The resistor 14 may be replaced by a semiconductor switch that provides resistance when it is turned on. Then, the charging current may be reduced as the charge proceeds toward the late stage.

The control unit 13 closes the switch 12 to start the direct current charge. Due to a voltage drop across the resistor 14, the charging current can be reduced in the late stage of the charge of the lithium ion battery 10.

In the configuration including the direct current power source illustrated in FIG. 8, the charging efficiency may decrease because the charging power may be converted into a thermal energy due to heat generation of the resistor 14. Furthermore, a problem may occur during a rapid charge. For the rapid charge, the output voltage of the direct current power source 40 needs to be increased. With such a configuration, a large current flows through the lithium ion battery 10 in the early stage of the charge.

In comparison to the above configuration, the configuration including the alternate current power source illustrated in FIG. 1 has the following advantages.

(1) In comparison to the configuration including the direct current power source illustrated in FIG. 8, a decrease in charging efficiency due to heat generation is small. For example, by replacing the resistor 6 by a coil, the charging current can be decreased as the charge proceeds toward the late stage.

(2) In comparison to the configuration including the direct current power source illustrated in FIG. 8, the rapid charge can be easily performed. With the alternate current power source, the output voltage does not need to be increased for the rapid charge. The charging current can be adjusted by switching operation of the switch 1. Therefore, a large current is less likely to flow through the lithium ion battery 10 in the early stage of the charge.

(3) A widely used commercially available power source can be used, and an additional direct current power source is not required.

Second Embodiment

Figure 9:
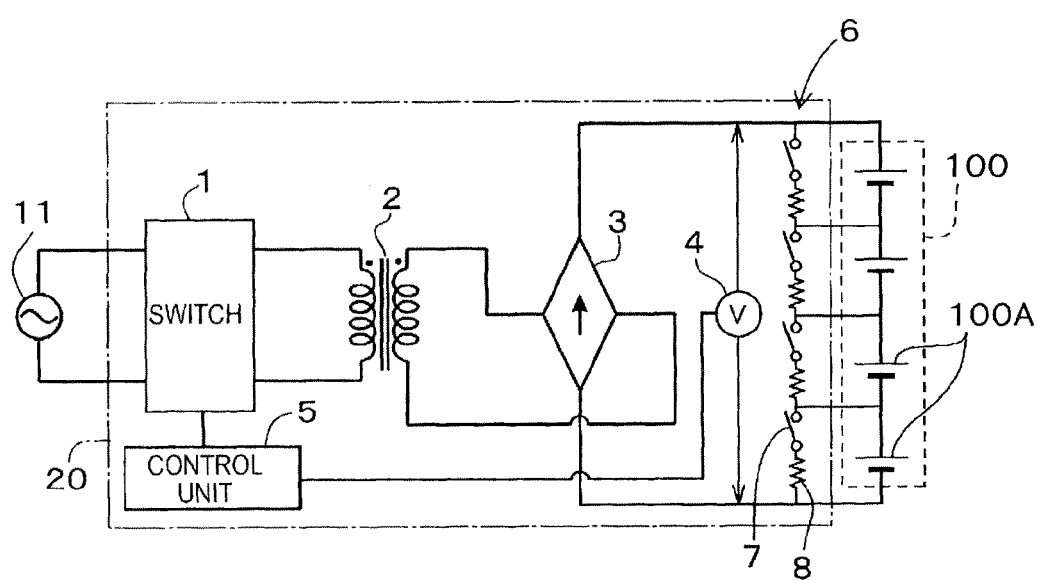
FIG. 9 is a circuit diagram illustrating a schematic configuration of a charging circuit according to a second embodiment.

As illustrated in FIG. 9, in a second embodiment, positive electrode plates of a lithium ion battery 100 to be charged are different from the lithium ion battery 10 in the first embodiment. The lithium ion battery 100 is not an electric cell but is an assembled battery including a plurality of electric cells 100A connected in series.

Because the lithium ion battery 100 is an assembled battery, an output voltage of the charging circuit 20 is different from that in the first embodiment. Other configurations of the charging circuit 20 are in common with those of the charging circuit 20 in the first embodiment. If the output voltage of each electric cell is set to 3.6V and four electric cells are connected in series, an overall output voltage of the charging circuit 20 is set to 14.4V. Therefore, the assembled battery can be charged using an existing DC12V charger for charging a lead battery. Namely, the charging circuit can be provided at very low cost. The output voltage of the charging circuit 20, that is, a total voltage of the assembled battery on a full charge is not limited to 14.4V.

The assembled battery can be charged an existing DC12V battery charger as long as the total voltage is within a range from 12 to 16V.

The charging circuit 20 includes a known balance circuit for reducing variations in battery voltage between the electric cells 100A. A balance circuit 6 is an example. The balance circuit 6 includes switching elements 7 and discharge resistors 8 connected in parallel with the electric cells 100A. The control unit 5 monitors a voltage across terminals of each electric cell 100A using voltage sensors (not shown). The control unit 5 closes the switching element connected in parallel to the electric cell 100A having a higher battery voltage than that of the other electric cells 100A to reduce the battery voltage.

The positive electrode plates of the lithium ion battery 10 in the second embodiment are provided with a specific lithium compound in addition to the positive electrode active material in the first embodiment. With the specific lithium compound, a voltage in a flat voltage section of the charging characteristic curve is higher than the voltage of the battery including the lithium compound containing iron as the positive electrode active material (i.e., that in the first embodiment).

Cobalt-based $LiCoO_2$, nickel-based $LiNiO_2$, manganese $LiMn_2O_4$, or Li—Co—Ni—Mn based oxide (so-called ternary compound) may be suitable for the specific lithium compound (hereinafter may be referred to as "a mixing lithium compound"). Furthermore, some of the metal elements of the lithium compound may be replaced with different kinds of metal elements.

If the positive electrode including the lithium compound as the positive electrode active material is expressed by a ratio of a positive electrode potential to a reference electrode potential, that is, Li/Li+ as illustrated in FIG. 6, the voltage in the voltage flat section is in a range from 3.5V to 4.2V.

In the manufacturing step of the first embodiment, the positive electrode active material, the bonding agent, and the solvent are mixed and provided as a paste. If necessary, the electrically conductive additive may be added to the mixture. Then, the mixing lithium compound containing the above-described elements is added to the paste. As a result, the mixture of the lithium compound containing iron and the mixing lithium compound is produced.

The ratio of the specific lithium compound to the lithium compound containing iron should be equal to or lower than 5 percent by mass. If the ratio is too high, the energy density is decreased. Manufacturing steps after the step for producing the paste are the same as those in the first embodiment. The configuration of the negative electrode is the same as that of the first embodiment.

The lithium ion battery 10 manufactured as above has the charging characteristics illustrated in FIG. 3 when it is used as an electric cell. If the lithium ion battery 10 is the assembled battery including a plurality of the electric cells connected in series and the assembled battery is charged through the charging circuit 20 illustrated in FIG. 1, the variations in charging pace between the electric cells can be reduced without the balance circuit provided for each electric cell.

EXPLANATION OF SYMBOLS

10: Lithium ion battery
20: Charging circuit

The invention claimed is:

1. A charging method to charge a lithium on battery, comprising:
   charging an assembled battery including a plurality of lithium on battery cells connected in series,
   a lithium on battery cell of the plurality of lithium on battery cells including a lithium compound as a positive electrode active material used for a positive electrode material, through a quasi-constant voltage charging procedure in which a charging current applied to the assembled battery is gradually reduced and an application voltage is reduced according to a state of charge of the lithium on battery cell,
   the lithium compound comprising iron, and the assembled battery including a balancing circuit for cell balancing during the charging; and
   reducing the charging current as the charge proceeds toward a late stage during the charging of the assembled battery,
   wherein the charging of the assembled battery comprises charging the assembled battery through a charging circuit having dropping characteristics for reducing the voltage applied to the assembled battery as the charging current increases, the charging circuit supplying alternating current power from an alternating current power source to a rectifier via a leakage transformer, rectifying an alternating current by the rectifier, and supplying direct current power being converted from the alternating current power to the assembled battery.

2. The charging method according to claim 1, wherein the lithium ion battery cell is configured such that a voltage difference between a voltage in a flat voltage section of a charging characteristic curve and a battery voltage at which degradation starts is 0.6V or higher.

3. The charging method according to claim 1, wherein the lithium ion battery cell is configured such that a voltage at which degradation starts is 110% or higher of a voltage in a flat voltage section of a charging characteristic curve.

4. The charging method according to claim 3, wherein the flat voltage section is in the late stage of the charge.

5. The charging method according to claim 1, wherein the assembled battery has a total voltage in a range from 12V to 16V when the assembly battery is on a full charge.

6. The charging method according to claim 1, wherein the lithium ion battery cell includes a negative electrode made of graphite used as a negative electrode material.

7. The charging method according to claim 1, wherein the lithium compound containing iron is $LiFePO_4$.

8. The charging method according to claim 1, wherein the lithium ion battery cell includes the lithium compound and a specific lithium compound as the positive electrode active material used for the positive electrode material, the specific lithium compound being a compound with which a voltage in a flat voltage section of a charging characteristic curve is higher than a voltage of a battery cell including the lithium compound as the positive electrode active material.

9. The charging method according to claim 8, wherein the specific lithium compound comprises one of $LiCoO_2$, nickel-based $LiNiO_2$, manganese $LiMn_2O_4$, and Li—Co—Ni—Mn-based oxide.

10. The charging method according to claim 8, wherein a ratio of the specific lithium compound to the lithium compound comprising iron is equal to or less than five percent by mass.

11. A method of charging an assembled battery, comprising:
    charging an assembled battery using a quasi-constant voltage charging procedure in which a charging current applied to the assembled battery is gradually reduced and an application voltage is reduced according to a state of charge of the lithium on battery cell, the assembled battery comprising:
- a plurality of lithium on battery cells connected in series, a lithium on battery cell of the plurality of lithium on battery cells including a positive electrode active material comprising a first lithium compound comprising iron; and
- a balancing circuit for cell balancing during the charging; and reducing the charging current as the charge proceeds toward a late stage during the charging of the assembled battery, wherein the charging of the assembled battery comprises charging the assembled battery through a charging circuit having dropping characteristics for reducing the voltage applied to the assembled battery as the charging current increases, the charging circuit supplying alternating current power from an alternating current power source to a rectifier via a leakage transformer, rectifying an alternating current by the rectifier, and supplying direct current power being converted from the alternating current power to the assembled battery.

12. The method of claim 11, wherein the positive electrode active material further comprises a second lithium compound in amount which is less than the first lithium compound.

13. The charging method according to claim 1, wherein the charging circuit comprises:
- a switch connected to the alternating current power source,
- wherein the leakage transformer is connected between the switch and the assembled battery, and converts a voltage of the alternating current power source to a desired voltage such that the charging circuit has dropping characteristics for reducing the voltage applied to the assembled battery as a charging current increases.

14. The charging method according to claim 1,
wherein the charging circuit further comprises a voltage sensor, and a controller which monitors the application voltage from the rectifier to the assembled battery by using the voltage sensor, and wherein the lithium ion battery cell includes the lithium compound and an other lithium compound as the positive electrode active material, an amount of the other lithium compound in the positive electrode active material being less than an amount of the lithium compound in the positive electrode active material.

15. A method of charging a battery, comprising:
providing a battery comprising:
a plurality of lithium on battery cells connected in series, a lithium on battery cell of the plurality of lithium on battery cells including a positive electrode active material comprising a lithium compound which includes iron; and
a balancing circuit for cell balancing during the charging;
providing a charging circuit comprising:
a switch connected to an alternating current power source; and
a leakage transformer connected between the switch and the assembled battery, and converting a voltage of the alternating current power source to a desired voltage such that the charging circuit has dropping characteristics for reducing the voltage applied to the battery as the charging current increases,
the charging circuit supplying alternating current power from the alternating current power source to a rectifier via the leakage transformer, rectifying an alternating current by the rectifier, and supplying direct current power being converted from the alternating current power to the assembled battery; and
using the charging circuit to perform a quasi-constant voltage charging procedure in which a charging current applied to the battery is gradually reduced as the charging procedure proceeds toward a late stage and an application voltage is reduced according to a state of charge of the lithium on battery cell.

* * * * *